United States Patent [19]

Ueda et al.

[11] Patent Number: 5,083,883
[45] Date of Patent: Jan. 28, 1992

[54] LOCKABLE PUSHBUTTON PIN COUPLER

[75] Inventors: Herbert T. Ueda, Claremont, N.H.; William E. Burch, Windsor, Vt.

[73] Assignee: The United States of America as represented by the Secretary of the Army, Fort Belvoir, Va.

[21] Appl. No.: 343,249

[22] Filed: Apr. 26, 1989

[51] Int. Cl.⁵ .......................... F16B 7/00; F16D 1/10
[52] U.S. Cl. ............................. 403/328; 403/316; 403/324; 403/325; 403/354; 403/379
[58] Field of Search ............... 403/316, 317, 324, 325, 403/328, 348, 349, 350, 354, 381, 376–379, 13–14; 292/57, 59, 58, 60

[56] References Cited

U.S. PATENT DOCUMENTS

| 389,335 | 9/1888 | Spear | 403/328 |
|---|---|---|---|
| 2,284,180 | 5/1942 | Thomas | 403/317 X |
| 2,675,257 | 4/1954 | Specht | 403/328 |
| 2,980,456 | 4/1961 | McMullin | 403/328 |
| 3,449,003 | 6/1969 | Hunt | 403/324 |
| 3,449,003 | 6/1969 | Hunt | 403/324 |
| 3,472,539 | 10/1969 | Fenwick | 430/328 X |
| 3,685,865 | 8/1972 | Young | 403/315 |
| 3,980,409 | 9/1976 | Turner | 403/328 X |
| 4,042,305 | 8/1977 | Vincent | 403/14 |
| 4,047,821 | 9/1977 | Hoke et al. | 403/328 X |
| 4,597,472 | 7/1986 | Hjelm | 403/348 X |
| 4,626,123 | 12/1986 | Brown | 403/328 X |
| 4,635,327 | 1/1987 | Netenik | 403/328 X |

Primary Examiner—Andrew V. Kundrat
Assistant Examiner—Franco S. DeLiQuori
Attorney, Agent, or Firm—Darrell E. Hollis

[57] ABSTRACT

A locking structure for a spring-loaded, pushbutton pin coupler, the invention prevents inadvertent or accidental depression of a "button latch" pin which can result in an uncoupled joint. The present locking structure cooperates with a pushbutton pin connector such as is commonly used on collapsible or extendible arms or legs. According to the invention, a conventional button latch pin is provided with a locking plate at its inner end, rotation of the pin after coupling of joint with the pin causes the locking plate to also rotate into engagement with a fixed pin element carried by the structure coupled by the pin, thereby preventing displacement of the pin from the locked position.

31 Claims, 2 Drawing Sheets

LOCKABLE PUSHBUTTON PIN COUPLER

STATEMENT OF GOVERNMENT INTEREST

The invention described and claimed herein may be manufactured and used by or for the Government of the United States of America for governmental purposes without the payment of royalties thereon or therefor.

BACKGROUND OF THE INVENTION

1. Field of the Invention

The invention relates generally to spring-loaded, pushbutton pin couplers and particularly to a locking structure formed with a button latch pin of such couplers for preventing inadvertent uncoupling through accidental depression of the button latch pin.

2. Description of the Prior Art

Pushbutton pin couplers or connectors have long been used for coupling structural elements together, such elements commonly comprising collapsible or extendible arms or legs. Such couplers comprise a spring-loaded "button latch" pin mounted within a first structural element which is to be coupled to a second structural element. The first structural element has an aperture formed therein through which the button latch pin extends by virtue of force exerted by a spring mounted within a housing interiorly of the first structural element, the housing mounting the button latch pin for movement therewithin under the influence of said spring. The second structural element is provided with an aperture which mates the aperture of the first structural element, the button latch pin being depressible into the interior of the first structural element such that the aperture in the second structure can be aligned with the aperture in the first structural element. On alignment of the apertures, the pressure biasing the button latch pin inwardly of the first structural element is removed and the pin is biased outwardly by the spring, the pin thus extending through both apertures and acting to hold the two structural elements together. As can readily be seen from the foregoing description of the operation of a pushbutton pin coupler, a force directed against the button latch pin from externally of the coupled arrangement can cause the pin to be accidentally depressed and thus allow the coupled structural elements to disengage. In many coupling situations, such as the coupling of helical auger flight sections used in ice and frozen ground drilling, accidental decoupling of the pushbutton pin couplers holding the flight sections together results in the helical auger and associated flight sections below the uncoupled joint being left in the material being drilled. Accordingly, a long-felt need in the art has existed for providing means to prevent the accidental uncoupling of a pushbutton pin coupler.

In U.S. Pat. No. 4,597,472, Hjelm describes a spring-loaded latching pin which is locked into place by means of a second pin attached directly to the latching pin. Rotation of the latching pin in either an engaged or disengaged configuration allows the second pin to engage respective legs of a slot formed in the structure housing the latching pin. As such, Hjelm describes a pin coupler of sorts having structure capable of locking the pin coupler in a coupled configuration. In U.S. Pat. No. 3,449,003, Hunt provides two pins in a latch connection in an effort to ensure that the connection does not disengage. However, Hunt does not provide additional coupling structure which would prevent inadvertent depression of either of the latch pins included in the coupling. Specht, in U.S. Pat. No. 2,675,257, provides a button latch pin for connecting sections of a boring auger, the body of the auger carrying the latch pin also having a pin element extending transversely to the latch pin from the wall of the body and into engagement with the latch pin. However, this transversely extending pin only acts to limit the degree of travel of the latch pin and does not lock the latch pin in an engaged position. In U.S. Pat. No. 4,042,305, Vincent provides a button latch pin which operates in a conventional manner and is exemplary of a large body of art disclosing button latch pins which are not provided with structure capable of locking a button latch pin into a coupled configuration. Thomas, in U.S. Pat. No. 2,284,180, discloses a spring-loaded latching pin which is engaged or disengaged by manipulation of a pin disposed transversely to the latch pin and which is operated by a screwdriver to bias the latch pin out of engagement with structure which is being latched. While the structure of Thomas may act to prevent inadvertent disengagement of the spring-loaded pin element, neither Thomas nor any of the other references cited above provides a button latch pin having a restraining seat located at the anterior end of the pin and which cooperates with a second pin protruding transversely from a button latch pin housing within which the button latch pin is disposed, thereby enabling the button latch pin to be locked or released depending on the rotational position of the latch pin. The simple yet effective structure of the present invention is therefore an advance in the art due to the functioning of the present structure to prevent accidental uncoupling of a joint latched by a spring-loaded, pushbutton pin coupler.

SUMMARY OF THE INVENTION

The invention provides a simple, yet effective, locking structure for preventing inadvertent depression of a button latch pin which forms the primary coupling element of a spring-loaded pushbutton pin coupler. The button latch pin of the invention is provided with a locking plate at its anterior end, which locking plate cooperates with a second pin protruding transversely from a housing within which the button latch pin is disposed. Rotation of the button latch pin after coupling causes the locking plate to engage the second pin and therefore lock the button latch pin in a position wherein the button latch pin cannot be depressed. Further rotation of the button latch pin causes the locking plate to disengage the second pin and therefore decouples the pin coupler.

Accordingly, it is an object of the invention to provide a spring-loaded pushbutton pin coupler wherein the button latch pin of the coupler can be rotated between locked and release positions to either engage or disengage structure associated with the housing of the pin and thus either prevent or allow movement of the pin along its longitudinal axis.

It is another object of the invention to provide locking structure for a spring-loaded, pushbutton pin coupler wherein a button latch pin of the coupler is provided with a locking plate at its inner end which cooperates with a pin element attached to the button latch pin housing so that rotation of the button latch pin allows the button latch pin to be either locked against axial displacement or to be free to be axially displaced on pressure exerted longitudinally against said button latch pin.

Further objects and advantages of the invention will become more readily apparent in light of the following detailed description of the preferred embodiments.

DESCRIPTION OF THE PREFERRED EMBODIMENTS

Figure 1:
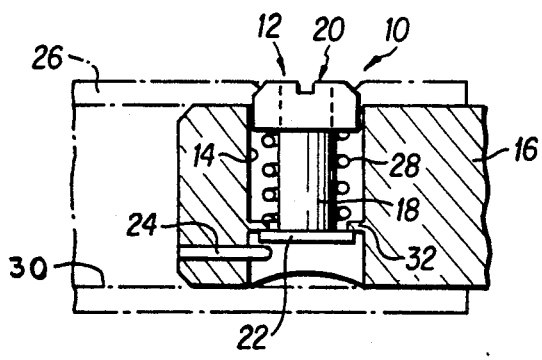
FIG. 1 is an elevational view in partial section of a spring-loaded, pushbutton pin coupler carried in a first structural element and shown coupling said first structural element to a second structural element, the pin coupler being provided with the locking structure of the invention in a locked configuration.
Figure 2:
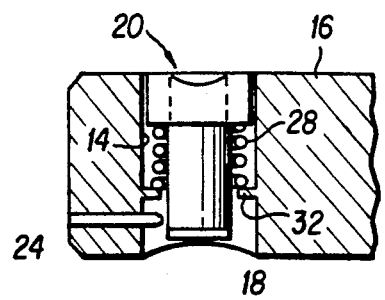
FIG. 2 is an elevational view in partial section of the spring-loaded, pushbutton pin coupler of FIG. 1 with the pin coupler shown rotated to a release configuration such that the pin of the coupler is free for movement along its longitudinal axis.

Referring now to the drawings and particularly to FIGS. 1 and 2, the lockable spring-loaded, pushbutton pin coupler 10 comprises a button latch pin 12 mounted for movement along its longitudinal axis within bore 14 formed in a cylindrical structural element 16. The button latch pin 12 comprises a pin body 18 and a button head 20, the button head 20 being provided on the distal end of the pin body 18. The anterior end of the pin body 18 is provided with a locking plate 22, the conformation of which can be best seen in FIGS. 5 and 6. The locking plate 22 is substantially rectangular in shape with the minor sides of the rectangle being arcuate and congruent with opposed wall surfaces of the bore 14. The locking plate 22 cooperates with locking pin 24 to lock the pin coupler 10 in a position which prevents inward depression of the button latch pin 12 and thus inadvertent release of the structural element 16 from structural element 26 which is coupled to the element 16 by the pin coupler 10. The locking pin 24 is mounted within the structural element 16, the distal end of the locking pin 24 extending into the bore 14 at a position below the button latch pin 12 as seen in FIG. 1 when the button latch pin 12 is in that position which couples the structural 16 and 26 together.

Figure 3:
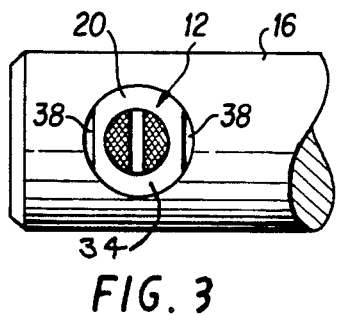
FIG. 3 is a plan view of the pin coupler of FIG. 1 showing the head of the pin in a locked position.
Figure 4:
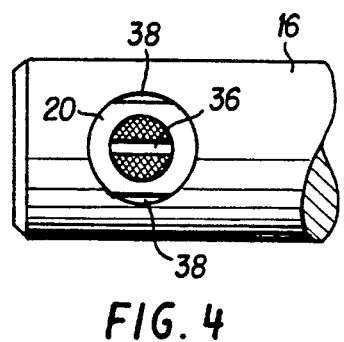
FIG. 4 is a plan view of the pin coupler of FIG. 1 showing the head of the pin in an unlocked position.
Figure 5:
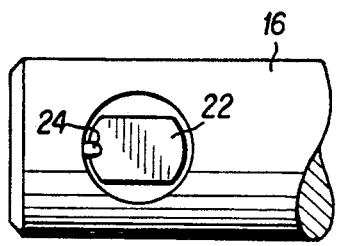
FIG. 5 is a plan view of a pin coupler such as is seen in FIG. 3 shown from the opposite side in order that the locking plate and locking pin of the invention can be seen in a locked configuration.

Referring to FIGS. 1-6, the locked position of the button latch pin 12 is seen in FIGS. 1, 3, and 5, the button latch pin 12 being biased by spring 28 into that position which couples the structural elements 16 and 26 together. In this position, the button head 20 of the button latch pin 12 extends outwardly of the bore 14 and into aperture 30 formed in the structural element 26. As is conventional, the button latch pin 12 thus holds the structural elements 16 and 26 together when in this position. Annular ring 32 conventionally mounts the spring 28 in the pin coupler 10, the spring 28 biasing against the annular ring 32 and against the underside of the button head 20 in a conventional manner.

Figure 6:
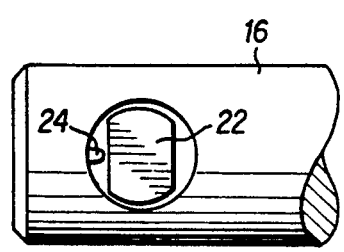
FIG. 6 is a plan view of the pin coupler such as is seen in FIG. 4 shown from the opposite side in order that the locking plate and locking pin of the invention can be seen in an unlocked configuration; and, FIG. 7 is a plan view of an alternative embodiment of the invention similar to the illustration of FIG. 6 but with a locking plate of a substantially circular configuration shown in an unlocked position.

In the locked configuration of FIGS. 1, 3 and 5, the button latch pin 12 has been rotated from its "free" position as seen in FIGS. 2, 4 and 6, to cause the locking pin 24 to extend beneath one of the curved portions of the locking plate 22. Accordingly, the button latch pin 12 cannot then be depressed either accidentally or intentionally to cause release of the structural elements 16 and 26. As will be noted from the shape of the locking plate 22, an angular rotation of the button latch pin 12 of approximately 75 degrees brings the locking pin 24 into locking relation with the locking plate 22 due to the curvature of the ends of the locking plate 22. The button latch pin 12 in this position is thus locked against inadvertent decoupling of the structural elements 16 and 26.

As seen in FIGS. 2, 4 and 6, the button latch pin 12 has been rotated to an angle sufficient to cause the locking plate 22 to pass the locking pin 24 with the result that the button latch pin 12 can be depressed within the bore 14 to allow decoupling of the structural element 16 from structure to which the element 16 has been coupled. In this configuration, the button latch pin 12 can be depressed into the bore 14 under the bias of the spring 28 to allow decoupling or to allow the sliding of a structural element such as the structural 26 onto the structural element 16 with subsequent mating of the button latch pin 12 with an aperture in said structural element which is to be coupled to the structural element 16. On release of "assembly" pressure in such a situation, the spring 28 causes the button latch pin to pop out of the bore 14 and into coupling engagement as is conventional.

The exterior face of the button head 20 can be knurled over surface 34 to facilitate rotation with a fingertip. Further, slot 36 or other suitable depression or socket car be provided to allow the button latch pin 12 to be rotated with a screwdriver, fingernail, socket head wrench such as an Allen wrench, or similar implement. Parallel bevels 38 provided or the button head 20 prevent rotation of the button latch pin 12 when the pin 12 is depressed and sliding through a mating bore such as the bore 30 in structural element 26.

Figure 7:
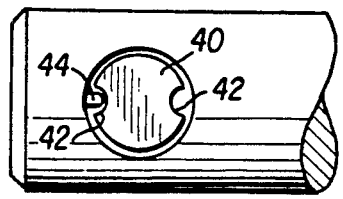
Figure 8:
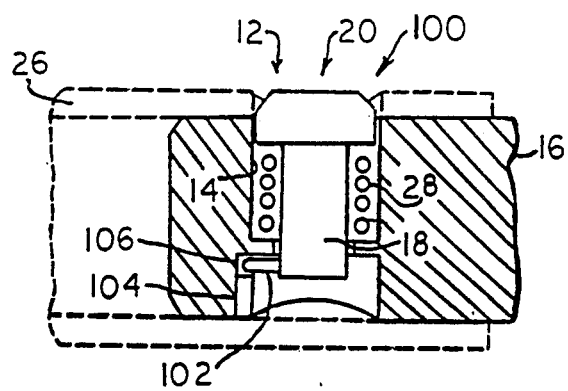
FIG. 8 is an elevational view in partial section of a still further embodiment of the present invention.

FIG. 7 shows a locking plate 40 which is circular in conformation and has spaced notches 42 disposed in diametrically spaced relationship on said plate 40. The notches 42 allow locking pin 44 to pass within the confines of one of the notches 42 in the "free" position as shown in FIG. 7, this position being functionally equivalent to the position of the locking plate 22 as seen in FIG. 6. As will be noted with the embodiment of FIG.

7, the pin coupler structure (not shown in FIG. 7) attached to the locking plate 40 would only need to be rotated over a relatively small angle in order to bring the locking plate 40 into a locking position which would be essentially equivalent to that shown in FIG. 5.

Now turning to FIGS. 8-12 a second embodiment 100 of the present invention is disclosed. Embodiment 100 comprises a latch pin 12 mounted for movement along its longitudinal axis within a bore 14 formed in a cylindrical structural element 16. The button latch pin 12 comprises a pin body 18 and a button head 20. A pin 102, extending outward from the latch pin body 18 and disposed to ride within grooves 104 and 106, is attached to the lower end of the latch pin body 18. The pin 102 cooperates with grooves 104 and 106 to lock the pin coupler 100 in a position which prevents inward depression of button latch pin 12 and thus inadvertent release of the structural element 16 from structural element 26. Structural element 26 is coupled to structural element 16 by pin coupler 100.

Figure 9:
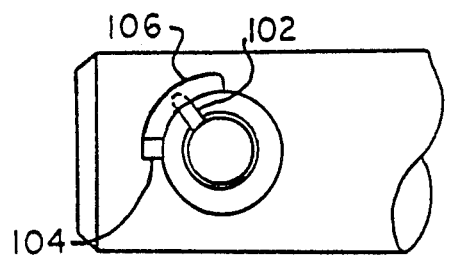
FIG. 9 is a plan view of the pin coupler embodiment as is seen in FIG. 8 shown from the bottom side illustrating the locked position.
Figure 10:
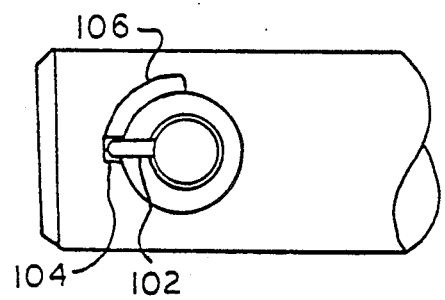
FIG. 10 is a plan view of the embodiment of FIG. 8 with the pin body 18 having been rotated to illustrate the unlocked position.
Figure 11:
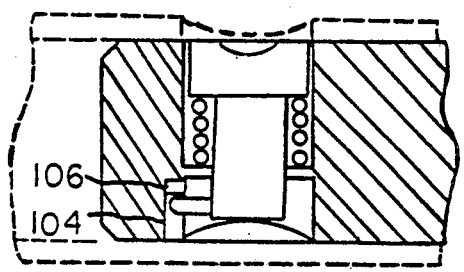
FIG. 11 is an elevational view illustrating the position of pin 102 within groove 104 in the free position.
Figure 12:
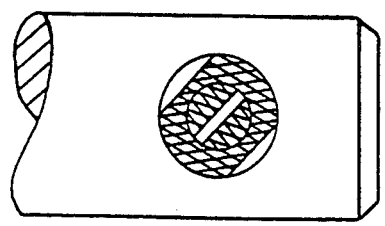
FIG. 12 is a plan view illustrating the position of the head of the pin 12 in the unlocked position.

The grooves 104 and 106 are formed in the wall of bore 14 with groove 104 being vertically disposed and groove 106 being horizontally disposed. Turning now to FIGS. 9 and 10, the operation of pin 102 and grooves 104 and 106 will be described. The button latch pin 12 is shown in its locked position in FIG. 9. The pin 102 is positioned within horizontal groove 106 and is thereby constrained from vertical motion.

The button latch pin 12 is shown in its unlocked position in FIG. 10. To move button latch pin 12 from its locked position as shown in FIG. 9 to its unlocked position as shown in FIG. 10, pin body 18 is rotated thereby moving pin 102 from its locked position within groove 106 to its unlocked position in groove 104. When pin 102 is in registry with vertical groove 104 button latch pin 12 may be depressed with pin 102 moving vertically within groove 104.

The embodiment shown in FIGS. 8-12 operates identically to the embodiments shown in FIGS. 1-7 except for the locking mechanism.

While the figures describe the structural elements 16 as being cylindrical in conformation, the structural elements 16 can be otherwise shaped as can the bore 14 formed in said element 16. Similarly, FIG. 1 shows the structural element 26 as being tubular in conformation such that the cylindrical structural elements 16 can slide into an open end of the structural element 26. While these particular shapes are convenient and common in the art, it is to be understood that the structural elements which are to be coupled together can be otherwise configured. Such modifications to the invention can be accomplished without departing from the scope of the invention. Those of ordinary skill in the art, however, will readily note the advantages of the particular structural conformations as shown in the drawings.

Accordingly, it said to be understood that the invention can be configured other than as expressly described herein, the scope of the invention being limited only by the recitation of the appended claims.

What is claimed is:
1. A pushbutton pin coupler comprising:
   a. a first structural element having a bore therein;
   b. a button latch pin, including a pin body and a button head movable within said bore both longitudinally and rotationally;
   c. a second structural element having an aperture formed therein;
   d. means for biasing said button latch pin out of said bore and into but not through said aperture whereby said first and second structural elements are coupled together;
   e. means carried by said button latch pin and rotatable therewith for providing an abutment surface; and,
   f. pin means mounted on said first structural element and extending into the bore for abutting said abutment surface providing means and preventing movement of said button latch pin into said bore to a degree sufficient to decouple the elements when said abutment surface providing means are rotated within said bore to a locking position relative to said pin means.

2. In the pin coupler of claim 1 wherein the abutment surface providing means comprises a locking plate carried by the anterior end of the button latch pin, the locking plate having body portions shaped to engage the pin means and lock the button latch pin when the locking plate has been rotated with the button latch pin to a locking position relative to the pin means.

3. In the pin coupler of claim 2 wherein the pin means comprise a locking pin, the distal end of the locking pin extending into the bore at a location proximus to and spaced from the locking plate when the button latch pin has been rotated to a locking position to enable the locking pin and the locking plate to come into contact on depression of the button latch pin into the bore, thereby preventing decoupling of the structural elements.

4. In the pin coupler of claim 2 wherein the locking plate is substantially rectangular in conformation and has arcuately shaped ends, major sides of the plate being straight, the pin means contacting one of the arcuately shaped ends when the button latch pin is in a locked position and passing one of the straight sides of the plate when the button latch pin is in an unlocked position.

5. In the pin coupler of claim 2 wherein the locking plate is substantially circular in conformation and has notches formed therein in diametrically spaced relation, the pin means contacting the substantially circular edge portions of the plate when the button latch plate is in a locked position and passing one of the notches when the button latch pin is in a unlocked position.

6. In the pin coupler of claim 1 wherein at least portions of the exterior surface of the button head are knurled to facilitate positive contact between the head and a fingertip, thereby facilitating rotation of the button latch pin.

7. In the pin coupler of claim 1 wherein the exterior surface of the button head is provided with a slot to facilitate engagement between the head and an implement such as a screwdriver, thereby facilitating rotation of the button latch pin.

8. In the pin coupler of claim 1 wherein opposite sides of the button head are beveled.

9. A pushbutton pin coupler comprising a first structural element having a bore therein, a button latch pin mounted under bias of a spring within said bore, a second structural element telescopically mounted to said first structural element, said button latch pin having a pin body and a button head formed on one end thereof movable within said bore both longitudinal and rotationally and a locking plate formed on another end opposite said one end thereof; a locking pin mounted to said first structural element and extending at least partially into said bore to contact a portion of the locking plate when the plate is in a first locked position, thereby to prevent longitudinal movement of longitudinal movement of the button latch pin within the bore when the plate is in a second unlocked position.

10. The coupler of claim 9 wherein the locking plate is substantially rectangular in conformation and has arcuately shaped ends, major sides of the plate being straight, the locking pin contacting one of the arcuately shaped ends when the button latch pin is in a locked position and passing one of the straight sides of the plate when the button latch pin is in an unlocked position.

11. The coupler of claim 9 wherein the locking plate is substantially circular in conformation and has notches formed therein in diametrically spaced relation, the locking pin contacting a substantially circular edge portions of the plate when the button latch pin is in a locked position and passing one of the notches when the button latch pin is in an unlocked position.

12. The coupler of claim 9 wherein at least portions of an exterior surface of the button head are knurled to facilitate positive contact between the head and a fingertip, thereby facilitating rotation of the button latch pin.

13. The pin coupler of claim 9 wherein an exterior surface of the button head is provided with a slot to facilitate engagement between the head and an implement such as a screwdriver, thereby facilitating rotation of the button latch pin.

14. The coupler of claim 9 wherein opposite sides of the button head are beveled.

15. A pushbutton pin coupler comprising:
 a. a first structural element having a bore therein;
 b. a button latch pin, including a pin body and a button head, movable within said bore both longitudinally and rotationally;
 c. a second structural element having an aperture formed therein;
 d. means for biasing said button latch pin out of said bore and into but not through said aperture whereby said first and second structural elements are coupled together;
 e. pin means mounted on said first structural element and extending into said bore for preventing movement of said button latch pin into said bore to a degree sufficient to decouple said first and second structural elements when said button latch pin is rotated within said bore to a locking position.

16. The pin coupler of claim 15 wherein said movement preventing means comprises a pin, mounted on said button latch pin, extending into and riding within first and second grooves formed in the surface of said bore.

17. The pin coupler of claim 16 wherein:
 a. said first groove is disposed substantially perpendicular to the longitudinal axis of said bore;
 b. said second groove is disposed substantially parallel to the longitudinal axis of said bore; and,
 c. whereby said button latch pin assumes said locked position when said pin is located within said first groove and whereby said button latch pin assumes an unlocked position when said pin is located within said second groove.

18. The pin coupler of claim 15 wherein portions of an exterior surface of said button head are knurled to facilitate positive contact between the head and a fingertip, thereby facilitating rotation of the button latch pin.

19. The pin coupler of claim 15 wherein the exterior surface of the button head is provided with a slot to facilitate engagement between said had and an implement, thereby facilitating rotation of the button latch pin.

20. The pin coupler of claim 15 wherein opposite sides of said button head are beveled.

21. A pushbutton pin coupler comprising:
 a. a first structural element having a bore therein;
 b. a button latch pin, including a pin body and a button head, movable within said bore both longitudinally and rotationally;
 c. a second structural element having an aperture formed therein;
 d. means for biasing said button latch pin out of said bore and into but not through said aperture whereby said first and second structural elements are coupled together;
 e. a locking plate carried by the anterior end of the button latch pin, the locking plate being substantially rectangular in shape and having arcuately shaped ends, major sides of the plate being straight; and,
 f. pin means mounted on said first structural element and extending into the bore for contacting one of the arcuately shaped ends of said locking plate when the button latch pin is in a locked position and passing one of the straight sides of the plate when the button latch pin is in an unlocked position, said pin means preventing movement of said button latch pin into said bore to a degree sufficient to decouple the elements when said button latch pin is rotated within said bore to the locking position relative to said pin means.

22. A pushbutton pin coupler comprising a button latch pin mounted under bias of a spring within a bore formed in one structural element of a pair of telescopically mating structural elements which can be coupled together, the button latch pin having a pin body, a button head formed on one end thereof, movable within said bore both longitudinally and rotationally and a locking plate formed on another end opposite said one end, said locking plate being substantially rectangular in shape and having arcuately shaped ends, major sides of the plate being straight; a locking pin mounted to said one structural element and extending at least partially into the bore to contact a portion of the locking plate when the plate is in a first locked position, thereby preventing longitudinal movement of the button latch pin within the bore, and allowing longitudinal movement of the button latch pin within the bore when the plate is in a second unlocked position.

23. The coupler of claim 22 wherein the locking plate is substantially circular in shape having diametrically opposed notches formed therein, said locking pin contacting a substantially circular edge portion of the plate when the button latch pin is in a locked position and passing one of the notches when the button latch pin is in an unlocked position.

24. The coupler of claim 22 wherein portions of an exterior surface of the button head are knurled to facilitate positive contact between the head and a fingertip, thereby facilitating rotation of the button latch pin.

25. The coupler of claim 22 wherein an exterior surface of the button head is provided with a slot to facilitate engagement between the head and an implement such as a screwdriver, thereby facilitating rotation of the button latch pin.

26. The coupler of claim 22 wherein opposite sides of the button head are beveled.

27. A pushbutton pin coupler comprising:
a. a first structural element having a bore therein;
b. a button latch pin, including a pin body and a button head, movable within said bore both longitudinally and rotationally;
c. a second structural element having an aperture formed therein;
d. means for biasing said button latch pin out of said bore and into but not through said aperture whereby said first and second structural elements are coupled together;
e. a pin, mounted on said button latch pin, extending into and riding within first and second grooves formed in a surface of said bore, said button latch pin being prevented from moving to a degree sufficient to decouple said first and second structural elements when said pin is rotated to a locking position;

28. The pin coupler of claim 27 wherein;
a. said first groove is disposed substantially parallel to the longitudinal axis of said bore; and
b. whereby said button latch pin assumes said locked position when said pin is located within said first groove and whereby said button latch pin assumes an unlocked position when said pin is located within said second groove.

29. The pin coupler of claim 27 wherein portions of an exterior surface of said button head are knurled to facilitate positive contact between said head and a fingertip, thereby facilitating rotation of the button latch pin.

30. The pin coupler of claim 27 wherein an exterior surface of said button head is provided with a slot to facilitate engagement between said head and an implement, thereby facilitating rotation of the button latch pin.

31. The pin coupler of claim 27 wherein opposite sides of said button head are beveled.

* * * * *